United States Patent [19]

Szudy

[11] Patent Number: 5,065,837
[45] Date of Patent: Nov. 19, 1991

[54] HANDRAIL FOR AIDING VISUALLY HANDICAPPED

[76] Inventor: Katherine A. Szudy, 6995 Edgecliff Dr., Parma, Ohio 44134

[21] Appl. No.: 650,907
[22] Filed: Feb. 5, 1991
[51] Int. Cl.⁵ .......................... G09B 1/00; E06C 5/34
[52] U.S. Cl. ..................................... 182/18; 182/106; 182/230; 52/182; 434/113
[58] Field of Search ................ 182/106, 18, 129, 230; 434/112, 113; 52/182; 256/59

[56] References Cited

U.S. PATENT DOCUMENTS 1,718,694 6/1929 Kurowski .
2,091,146 8/1937 Hamilton .
3,536,017 10/1970 Lucas ................................. 434/113
4,823,524 4/1989 Bednar ............................... 182/106
4,856,761 8/1989 Berner ................................ 182/113
5,027,741 7/1991 Smith .................................. 182/18

Primary Examiner—Reinaldo P. Machado
Attorney, Agent, or Firm—Tarolli, Sundheim & Covell

[57] ABSTRACT

An improved handrail is provided to aid a visually handicapped person in moving up and down stairs. The handrail extends along the stairs. Indicia on the handrail identifies the steps along which the handrail extends. The indicia is in the braille system and includes characters which project downwardly away from a lower side of the handrail.

3 Claims, 1 Drawing Sheet

HANDRAIL FOR AIDING VISUALLY HANDICAPPED

BACKGROUND OF THE INVENTION

The present invention relates to a handrail for aiding a visually handicapped person in traversing stairs.

The use of an elevator by a visually handicapped person has been facilitated by the providing of indicia adjacent to buttons which must be pressed to have the elevator travel to a desired floor. The indicia identifies the floor to which pressing of the adjacent button will cause the elevator to travel. The indicia is in the braille system and includes characters which project outwardly for a distance sufficient to enable the characters to be felt by human fingers. The indicia enables a visually handicapped person to determine which button is to be pushed to have the elevator go to a desired floor.

Indicia has been provided in association with other devices to aid in the use of the devices by the visually handicapped. Thus, U.S. Pat. No. 2,091,146 discloses a clock having both printed numerals and numerals in braille to enable a visually handicapped person to ascertain the time. In addition, U.S. Pat. No. 1,718,694 discloses a typewriter having printed characters and braille characters to identify each of the keys of the typewriter.

SUMMARY OF THE INVENTION

The present invention provides a new and improved apparatus for aiding a visually handicapped person moving up and down stairs. A handrail extends along the stairs. Indicia on the handrail identifies the steps along which the handrail extends. The indicia is in the braille system and has characters which project outwardly from the handrail for a distance sufficient to enable the characters to be felt by human fingers. A visually handicapped person having knowledge of the braille system can distinguish the characters to determine the number of steps in a flight of stairs and/or the location of a step in the flight of stairs.

Accordingly, it is an object of this invention to provide a new and improved apparatus for use in aiding a visually handicapped person in moving up and down stairs and wherein the apparatus includes indicia on a handrail to identify steps along which the handrail extends.

BRIEF DESCRIPTION OF THE DRAWINGS

The foregoing and other objects and features of the present invention will become more apparent upon a consideration of the following description taken in connection with the accompanying drawings, in which.

DESCRIPTION OF ONE SPECIFIC PREFERRED EMBODIMENT OF THE INVENTION

A handrail 10 (FIG. 1) constructed in accordance with the present invention extends along a flight 12 of stairs. The flight 12 of stairs includes a plurality of steps, that is, steps designated by the numerals 1 through 6 in FIG. 1. In accordance with common practice, the handrail 10 is mounted on a wall 14 at a level so as to be readily engaged by the hand of a person moving up or down the flight 12 of stairs.

Figure 3:
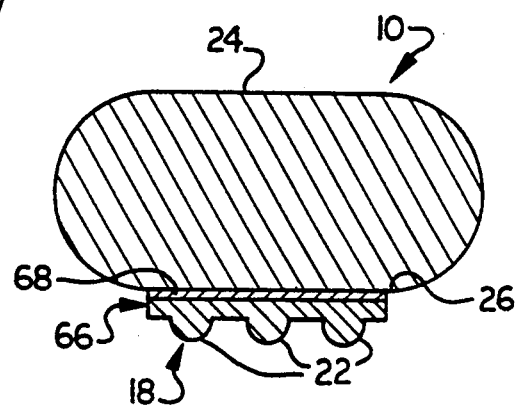
FIG. 3 is a sectional view, taken generally along the line 3—3 of FIG. 1, further illustrating the relationship of the indicia to the handrail.
Figure 2:
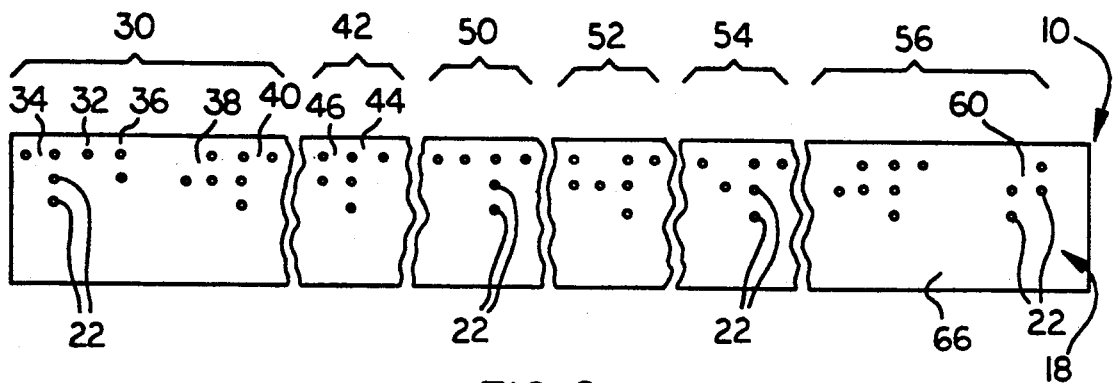
FIG. 2 is a plan view, taken generally along the line 2—2 of FIG. 1, of a lower side of the handrail and illustrating the relationship of the indicia to the handrail.

In accordance with a feature of the present invention, indicia 18 (FIG. 2) is provided on the handrail 10 to identify steps along which the handrail extends. The indicia 18 is in the braille system and includes characters 22 (FIGS. 2 and 3) which project outwardly from the handrail for a distance sufficient to enable the characters to be felt and distinguished by human fingers. The handrail 10 has upper and lower sides 24 and 26 (FIG. 3). The indicia 18 is disposed on the lower side 26 of the handrail 10.

Since the characters 22 are in the braille system, the characters are formed by projections or protuberances which project downwardly from the lower side 26 of the handrail toward the steps 1–6 of the flight 12 of stairs. When a visually handicapped person manually grips the handrail 10, the fingers of the visually handicapped person will be wrapped around the lower side 26 of the handrail and will engage the characters 22 of the indicia 18. Therefore, by merely gripping the handrail 10 in the normal manner, the hand of a visually handicapped person will automatically be positioned to engage the indicia 18 to enable the visually handicapped person to manually read the indicia. Since the indicia 18 is on the lower side 26 of the handrail 10, the handrail protects the indicia, to some extent at least, against excessive wear and/or damage.

The indicia 18 (FIG. 2) includes six groups of characters in the braille system. Each group of characters identifies one of the steps 1–6 of the flight 12 of stairs. In addition, the group of indicia associated with the first or lower step 1 of the flight of stairs 12 indicates that the lower step 1 is the first step in a flight of 6 steps.

Specifically, the first group of indicia 30 includes characters in a cell or pair of columns 34 (FIG. 2) which indicate the numeral 1 for the first step. The next cell 32 sets forth the sign indicating a numeral. The third cell 36 contains characters setting forth the letter B. This is to indicate to the visually handicapped person that step 1 is at the bottom of the flight of stairs. The next two cells 38 and 40 of characters 22 set forth the numeral 6 to inform the handicapped person that there are 6 steps in the flight of stairs.

The next succeeding group 42 of characters in the indicia 18 includes a cell 44 of characters indicating that a numeral is defined by the characters in a cell 46. The cell 46 of characters sets forth the numeral 2 corresponding to the second step in the flight of steps. The second step is indicated by the numeral 2 in FIG. 1. The group 42 of characters is disposed directly above the step designated by the numeral 2 in FIG. 1.

Figure 1:
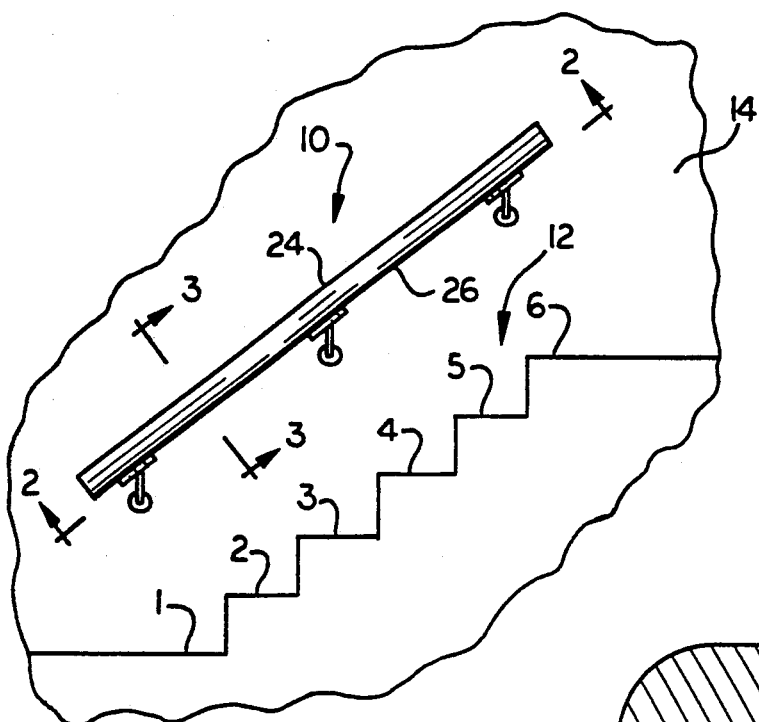
FIG. 1 is a schematic illustration depicting the relationship between a flight of stairs and a handrail having indicia in the braille system identifying steps in the flight of stairs along which the handrail extends.

Similarly, the indicia 18 (FIG. 2) includes groups 50, 52, 54 and 56 of characters identifying steps 3, 4, 5 and 6 of FIG. 1. The group 56 (FIG. 2) of indicia includes a cell 60 of characters setting forth the letter T in braille. Therefore, the group 56 of characters informs the visually handicapped person that he has reached the top of the flight 12 of stairs.

Although the foregoing explanation has been in the order of travel of the visually handicapped person up the flight of stairs, it should be understood that the indicia would function in the same manner to identify the various steps 1-6 in the flight 12 of stairs during travel of the visually handicapped person down the flight of stairs.

Although the indicia 18 could be provided on the handrail 10 in many different ways, it may be preferred to form the indicia 18 on a strip or base 66 (FIG. 3) with the characters 22 projecting from the base. The strip or base 66 may be secured to the lower side 26 of the handrail 10 with a suitable adhesive 68 or other type of fastener. Although the strip 66 extends for the length of the handrail 10 with the groups 30, 42, 50, 52, 54 and 56 of indicia directly above the steps identified by the groups of indicia, the strip 46 could be formed as a plurality of separate rectangular elements which are separately connected with the handrail 10 at locations directly above the steps 1-6. By providing the indicia identifying a particular step on a separate element, positioning of the element directly above steps of different dimensions would be facilitated.

It is contemplated that it may be desirable to mold the indicia 18 integrally with a strip base 66 formed of metal or plastic. However, the indicia 22 could be embossed on a metal base 66 if desired. It should be understood that the indicia 18 could be formed in the in many different ways and could be attached to the handrail 10 in many different ways.

The present invention provides a new and improved apparatus for aiding a visually handicapped person moving up and down stairs 12. A handrail 10 extends along the stairs 12. Indicia 18 on the handrail 10 identifies the steps 12 along which the handrail extends. The indicia 18 is in the braille system and has characters which project outwardly from the handrail for a distance sufficient to enable the characters to be felt by human fingers. A visually handicapped person, having knowledge of the braille system, can distinguish the characters 22 to determine the number of steps in a flight of stairs and/or the location of a step in the flight of stairs.

Having described one specific preferred embodiment of the invention, the following is claimed:

1. An apparatus for use in aiding a visually handicapped person in moving up and down stairs, said apparatus comprising a handrail extending along the stairs, and indicia on said handrail identifying steps along which said handrail extends, said indicia being in the braille system and including characters which project outwardly from said handrail for a distance sufficient to enable the characters of said indicia to be felt by human fingers.

2. An apparatus as set forth in claim 1 wherein said handrail has a longitudinally extending upper side which faces upwardly and a longitudinally extending lower side which faces downwardly, said indicia being disposed on the lower side of said handrail and projecting downwardly away from the lower side of said handrail toward the steps.

3. An apparatus as set forth in claim 1 further including base means upon which said indicia is disposed and means for securing said base means to said handrail.

* * * * *